Figure 1:
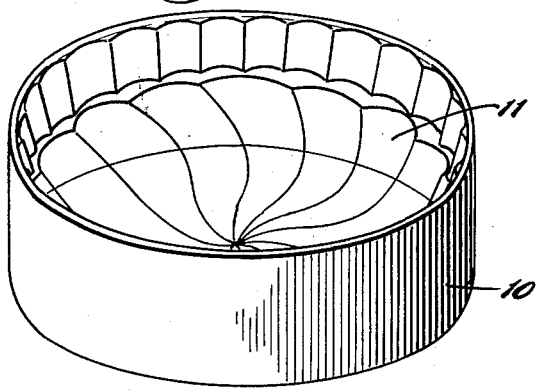

Sept. 14, 1954 E. W. COLT 2,689,183
GELATIN GEL PACKAGE AND METHOD
Filed Aug. 7, 1951

INVENTOR:
Edwin W. Colt.
BY Dawson & Ooms
ATTORNEYS.

Patented Sept. 14, 1954

2,689,183

UNITED STATES PATENT OFFICE 2,689,183

GELATIN GEL PACKAGE AND METHOD

Edwin W. Colt, Evanston, Ill., assignor to
Leo Peters, Evanston, Ill.

Application August 7, 1951, Serial No. 240,630

12 Claims. (Cl. 99—171)

This invention relates to a gelatine gel package and method of forming the same. It is common practice to package gelatin in dry form, so that the same may be combined with sugar, water, etc., in the forming of a gel by the housewife. The ingredients are combined to form a liquid in a container and after the gel has been formed, it is common to heat the outer walls of the container to permit the gel body to be released from the container.

Efforts have also been made to package the gelatin gel itself in containers so that the housewife may open the package and have the gelatine gel immediately available for use. A typical gelatine dessert may contain about 1.5% gelatine, 24.5% cane sugar, and about 74% water, to which is added natural or synthetic food flavors and certified food colors. Such gel products include jellied consommé, aspic, and other edible formulations in jellied form.

While the housewife is able to provide attractive molded gelatine desserts, salads, etc., by the first-named process above, the manufacturer of packaged gelatine gel has not been able to produce this same result. When the gelatin gel is packaged within a container and the housewife later, after opening the container, attempts to remove the gelatine gel, it is found that the gel clings so tightly to the container and is itself of such low cohesive strength, it is necessary to break the gel body in such removal, thus destroying any attractive form which it might have in the container itself. The common practice is to ladle the gel from the container. In any method of removal, substantial portions of the gel are found to cling to the container walls. There has long been a need for a gelatine gel package which will retain the gelatine body in an attractively-molded condition while permitting its ready release in intact condition from the package.

An object of the present invention is to provide a gelatine gel package from which a molded gelatine body may be removed in intact molded condition from the container. A further object is to provide a package for gelatine gel which is effective in sealing the gel body to the container while at the same time enabling the gel body to be removed in its still molded condition by simple inversion of the package container.

A still further object is to provide a method and means for packaging gelatine gel so as to preserve the same through substantial storage periods without deterioration in condition and then later, upon removal of the cover, permitting the molded body to be removed with the delicate mold lines thereof unaltered. A still further object is to provide in a gelatine gel package a container employing an airtight plastic film for holding the gelatine gel in molded condition while providing means especially cooperating with the plastic film to permit the film to be peeled away from the molded gel without destroying the mold lines thereof. Other specific objects and advantages will appear as the specification proceeds.

The invention is shown in an illustrative embodiment by the accompanying drawing, in which—

Figure 2:
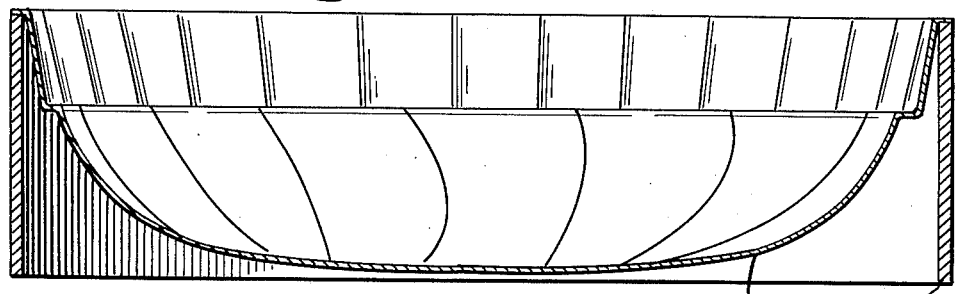

Figure 1 is a perspective view of one form of container which may be employed in the practice of the invention; Fig. 2, a vertical sectional view; and Fig. 3, an enlarged sectional view of the filled package prepared in accordance with my invention.

In the illustration given, 10 designates a cylindrical support from which is suspended a film 11 having mold lines therein, which film provides a reversible pocket adapted for molding and dispensing a gelatine food product. The film 11 is provided on its inner side with a sizing layer or coating 12. 13 designates the gelatine gel which may partially or substantially fill the coated container 11.

The container support above described is set forth merely as illustrative of one form of container that may be used. It will be understood that cavity-providing containers formed of molded pulpwood, plastic, metal foils, cardboard, etc. may be used. I have found that plastic liners or plastic film containers are particularly useful in the packaging of gelatine gels in that the material is substantially air-impervious and protects the gel against dehydration and deterioration during storage, etc. In the illustration given, the support 10 is illustrative of a simple means for supporting the plastic film 11 and the film 11 is formed by the use of a heated die or other means to provide a figured shape and to give the gelatine body an attractive molded design. The figured walls, however, increase the problem as to removal, because the gelatine gel with its low cohesive strength tends to cling to the irregular portions of the film walls. Upon removal of the gelatine gel, it is found that not only were substantial amounts of gelatine lost because of the clinging of portions thereof to the film 11, but also the mold lines of the gelatine gel body are marred and the removed body of gelatine is disfigured.

I have found that a very satisfactory gelatine gel product can be packed in such a manner as to permit the removal thereof merely by inverting the container by employing with the container a sizing or coating for the film or container wall, the sizing or coating having a cohesive strength less than that of the gelatine. By employing such a sizing or coating, the gelatine gel is united to the film or container wall so as to form a tight union therewith and seal the gel side walls while, upon inversion, the heavy body of gel produces a cleavage within the sizing layer and allows the molded gelatine body to be removed intact. As shown more clearly in Fig. 3, the film 11 is provided with a sizing film or coating 14, the sizing having the property of adhering to and completely covering the film 11 while at the same time having a lower cohesive strength than that of the edible gelatine gel. The sizing must be of such a character as to completely coat the inner surface of the film or container 11. Failure of the sizing to coat portions of the container would result in the gel clinging to those uncoated portions. I prefer that the sizing consist entirely of an edible substance which is preferably odorless and tasteless and that it form a true film when applied as an aqueous solution and dried. As above stated, the essential requirements are that the sizing completely wet the plastic liner or container and coat it, and that the sizing be of low cohesive strength and less than that of the gelatine gel and furthermore shall form a stable film.

Any suitable sizing having the above described essential properties may be employed. For example, boiled cornstarch, modified as described hereafter, is found to be satisfactory in providing a coating for the container while at the same time having less cohesive strength than that of the gelatine. I modify and weaken the cohesive strength of the boiled cornstarch sizing by adding glucose. By "glucose" is meant the commercial glucose of which corn syrup is an example. For example, an aqueous solution of 2% of boiled cornstarch and 2% of glucose may be brought to a boil for ten minutes and then allowed to cool for producing a very satisfactory sizing. The sizing may be poured into the container and then immediately drained therefrom, or it may be sprayed upon the interior walls of the container or applied in any other desired way. Other starches such as casava, or root starches, potato starches, etc., may be used.

The type of sizing employed may be varied widely, it being merely sufficient to provide such a material which will completely wet or coat the container wall while having a cohesive strength less than that of the gelatine gel.

Unusually good results have been obtained in connection with plastic liners or plastic container film because of the readiness with which the sizing flows over and coats the film, following into the minute recesses of the figured walls of the film while, at the same time, the flexible character of the film is unusually effective in enabling the gelatine gel to peel away gradually from the film without marring the molded gelatine gel product. In other words, the unfolding or flexing of the plastic film itself cooperates with the sizing of low cohesive strength in the breaking of the sizing under the weight of the gel body. Thus, although the gel body is very weak and of low cohesive strength, the slight flexing of the film 11 in conjunction with the sizing 14 produces a progressive separation of the gelatine body without marring the mold lines thereof.

The invention is applicable to a container of the rigid type or to a substantially rigid container provided with a liner, and the low cohesive strength sizing is effective in providing the release referred to. However, I have found that a more effective release action is accomplished where the lining or container wall is formed of a thin plastic film of the character described.

The film 11, whether used as a container itself or as a liner wall, is preferably formed of a plastic or thermoplastic film, such as, for example, chlorinated rubber (Pliofilm), vinylidene chloride (Saran), the polyamide resins (nylon), vinyl, polyethylene, polyvinyl alcohol, ethyleneglycolterephthalate, cellulose acetate, etc. Parchment paper, waxed paper, metal foils, and various other types of flexible or supporting webs may be used.

After the gel has been formed within the coated container, I prefer to seal the gel therein by the use of a cover 15, which may be heat-sealed to the plastic 11 or secured thereto by rubber adhesive or other adhesive means. The cover 15 may be formed of the plastic materials above described or any other suitable material for sealing the food product in airtight condition within the container.

In the operation of the process, the coating 14 is applied to the inner walls of the container 11 by pouring the solution into the container and immediately emptying it or by spraying the solution, etc. upon the walls. The sizing is then quickly dried and the warm gelatine is poured into the coated container, where it is allowed to cool and gel slowly. The film cover 15 is then preferably sealed in position to prevent the evaporation of moisture from the surface of the gel. It is desired to prevent such evaporation because this might cause sticking where the surface of the gel comes in contact with the plastic lining. It is not necessary, however, that the film cover 15 be applied until the product has jelled, and it is sometimes desirable to wait until after the jelling in order to avoid an excessive amount of condensate on the inside surface of the cover 15.

The following specific examples may be set out:

*Example 1*

1% of cornstarch, 1% of gelatine and 0.4% of citric acid were heated in water to 95° C. for 15 minutes. The citric acid may be used to weaken the gel strength of the gelatin gel. The coating was then applied by spraying upon the walls of the container and after the surface material was drained, a film completely covering the walls of the container was formed upon drying. A gelatine gel of the typical type described was formed therein. A gelatine dessert containing approximately 1.5% gelatine, 24.5% cane sugar, and 75% water, was introduced into the coated container and allowed to gel. After the gel had formed, a seal formed of Pliofilm was placed over the food body. After standing over night, the film cover was removed and the container inverted. The film mold of the character illustrated in Fig. 1 was found to be readily released from the gelatine body and the molded body separated cleanly and evenly therefrom with its figured walls intact.

*Example 2*

A rigid container having figured walls covered with a plastic liner was treated with a sizing formed as follows: The sizing consisted of 2% gelatine, 0.4% citric acid, and 0.2% polyethoxy sorbitan monooleate (Tween 80). The mixture was heated in water to 95° C. for 60 minutes and then applied by spraying to the liner of the container. A gelatine salad containing 1.5% gelatine, about 25% salad ingredients, and about 73.5% water was introduced in warm condition into the container and allowed to jell slowly. A plastic seal cover was secured over the liner. After the product had stood for two days, the cover was removed and the container inverted over a dish. The gelatine body separated from the molded container without marring the mold lines thereof.

*Example 3*

Figure 3:
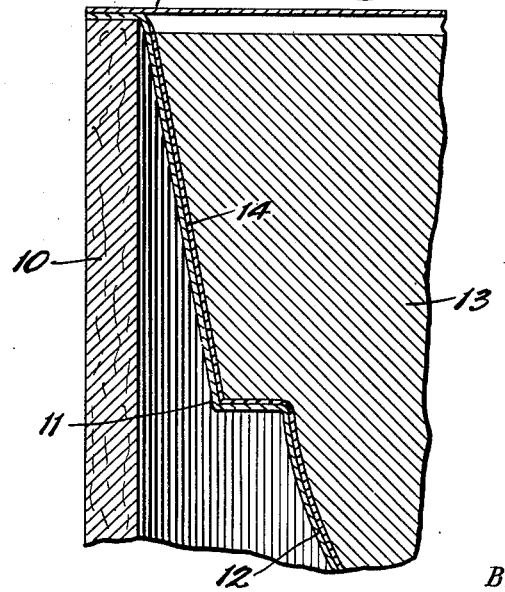

A container such as is illustrated in the figures of the drawing was used and a flexible film 11 formed of unplasticized vinyl-chloride acetate employed. The film was coated with a sizing consisting of 1% cornstarch and 2% glucose in water, the material being heated to 95° C. for 10 minutes. The sizing was applied to the container by filling it and then rapidly emptying the container. When the sizing was completely dry, the container was then filled with a gelatine dessert of the character described in Example 1. After jelling, the container was covered with an unplasticided vinyl-chloride acetate film seal, as shown in Fig. 3. After standing ten days, the cover 15 was removed and the container inverted. Under the weight of the gelatine gel contents, the flexible film 11 yielded and peeled away from the gelatin body, the film reversing itself in the peeling operation so as to be turned inside out. The gradual release of the gelatine body enabled the body to be accurately deposited upon the dish without any perceptible marring of the molded lines of the product.

A vast variety of other edible sizings have been employed which have a lower cohesive strength than that of gelatine, while at the same time tending to seal the space between the gelatine body and the container and preventing the gelatine from coming in contact directly with the container wall. All of such substances are effective in permitting a ready release of the gelatine body without causing portions of the gelatine to adhere to the film or container wall.

In the illustrations given in the foregoing examples, which represent preferred embodiments of this invention, the edible sizing layers or coatings are inherently hygroscopic. This permits the sizing layers to be dried on the packaging material as described while subsequently absorbing water from the gelatine food product. Further, it is readily apparent that sizing layers of the character described are inherently of lower cohesive strength when moist than when dry.

While in the foregoing specification, I have set forth a specific structure and method in considerable detail, it will be understood that such details may be varied widely by those skilled in the art without departing from the spirit of my invention.

I claim:

1. In a gelatine food product package including a container providing a cavity adapted for molding and dispensing a gelatine food product, a gelatine-containing food product in gelled condition within said cavity and conforming to its walls, and a layer of non-toxic material between said food product and said cavity walls, said layer in contact with said food product having a substantially lower cohesive strength than the cohesive strength of said food product in its gelled condition for promoting the release of said food product from said container in substantially intact condition.

2. In a gelatine food product package including a container adapted for molding and dispensing a gelatine food product, said container providing a cavity having flexible walls, a gelatine-containing food product in gelled condition within said container and conforming to said walls, and a hygroscopic layer of edible material between said food product and said cavity walls, said layer in contact with said food product having a substantially lower cohesive strength than the cohesive strength of said food product in its gelled condition for promoting the release of said food product from said container in substantially intact condition.

3. The gelatine food product package of claim 2 in which said flexible walls are formed of thermoplastic material.

4. In a gelatine food product package including a reversible pocket of thermoplastic film having mold lines in the walls thereof for molding a gelatine food product in a figured shape and including a support for said pocket, a gelatine-containing food product in gelled condition within said pocket and conforming to its walls, and a layer of non-toxic material between said food product and said pocket walls, said layer in contact with said food product having substantially lower cohesive strength than the cohesive strength of said food product in its gelled condition for promoting the release of said food product from said container in substantially intact condition.

5. In a gelatine food product package including a cylindrical support and a reversible pocket of thermoplastic film suspended from said support and having mold lines in the walls thereof for molding a gelatine food product in a figured shape, a gelatine-containing food product in gelled condition within said pocket and conforming to its walls, and a layer of edible material between said food product and said pocket walls, said layer in contact with said food product having a substantially lower cohesive strength than the cohesive strength of said food product in its gelled condition for promoting the release of said food product from said container in substantially intact condition.

6. In a gelatine food product package including a container for molding and dispensing a gelatine food product, said container providing a cavity having flexible walls of thermoplastic material, said walls having mold lines therein for molding a gelatine food product in a figured shape, a gelatine-containing food product in gelled condition within said container and conforming to said walls, and a hygroscopic layer of edible material between said food product and said cavity walls, said layer in contact with said food product having a substantially lower cohesive strength than the cohesive strength of said food product in its gelled condition for promoting the release of said food product from said container in substantially intact condition.

7. In a method of packaging a gelatine food product in a container providing a cavity for molding and dispensing such a product, the steps of forming said container with a coating of edible material on the walls of said cavity, which coating in contact with a gelatine-containing food product in gelled condition has a substantially lower cohesive strength than the cohesive strength of said gelatine-containing food product, thereafter introducing a gelatine-containing food product in moldable condition into said cavity, and solidifying said food product into a unitary gelled body within said cavity in contact with said coating on the walls thereof, whereby said gelled body can be released from said cavity in substantially intact condition without the necessity of heating the coated walls of said container.

8. In a method of packaging a gelatine food product, the steps of depositing a hygroscopic coating of an edible material on thermoplastic film by contacting a surface of said film with said edible material in an aqueous carrier, said coating in contact with a gelatine food product in gelled condition having a substantially lower cohesive strength than the cohesive strength of said gelatine-containing food product in its gelled condition, drying said coating to remove water therefrom, and packaging a gelled body of a gelatine food product in contact with the coated surface of said film, whereby said gelled body can be separated from said film in substantially intact condition.

9. The method steps of claim 8 in which the principal ingredients of said coating are starch and glucose.

10. The method steps of claim 8 in which said coating contains acid-treated starch as a principal ingredient thereof.

11. The method steps of claim 8 in which said coating contains acid-treated starch and gelatine as principal ingredients thereof.

12. The method steps of claim 8 in which said coating contains acid-treated gelatine as a principal ingredient thereof.

References Cited in the file of this patent

UNITED STATES PATENTS

| Number | Name | Date |
|---|---|---|
| 1,475,579 | Harlan | Nov. 27, 1923 |
| 1,945,397 | Gray | Jan. 30, 1934 |
| 2,019,552 | Watts | Nov. 5, 1935 |
| 2,045,730 | Schepman et al. | June 30, 1936 |
| 2,235,964 | Meyer et al. | Mar. 25, 1941 |
| 2,317,067 | Knaust | Apr. 20, 1943 |
| 2,631,939 | Peters | Mar. 17, 1953 |